United States Patent
Kuehn

[11] B 3,925,335
[45] Dec. 9, 1975

[54] VINYL URETHANE RESINS FROM HALOGENATED DIOLS AND PHOSPHONATE DIOLS

[75] Inventor: Erich Kuehn, Wilmington, Del.

[73] Assignee: ICI United States Inc., Wilmington, Del.

[22] Filed: May 29, 1973

[21] Appl. No.: 364,910

[44] Published under the Trial Voluntary Protest Program on January 28, 1975 as document no. B 364,910.

[52] U.S. Cl. .................. 260/859 R; 260/77.5 CR
[51] Int. Cl.$^2$ ............................................. C08L 75/00
[58] Field of Search .................... 260/859, 77.5 CR

[56] References Cited
UNITED STATES PATENTS

| | | |
|---|---|---|
| 3,297,745 | 1/1967 | Fekete .................. 260/77.5 AP |
| 3,371,056 | 2/1968 | Delius .................................. 260/22 |
| 3,509,234 | 4/1970 | Burlant .............................. 260/859 |
| 3,641,199 | 2/1972 | Niederhauser ..................... 260/859 |
| 3,642,943 | 2/1972 | Noel .................................. 260/859 |
| 3,677,920 | 7/1972 | Kai ..................................... 260/859 |
| 3,678,012 | 7/1972 | Matsuda ............................ 260/859 |

FOREIGN PATENTS OR APPLICATIONS 2,120,399   11/1971   Germany

*Primary Examiner*—Paul Lieberman

[57] ABSTRACT

Fire-retardant vinyl urethane resins having improved physical properties are disclosed. The resins are prepared from a composition comprising a halogen-containing diol, an isocyanate, a hydroxyl-terminated ester of acrylic or methacrylic acid, and a phosphonate having the following general formula:

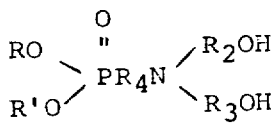

wherein R and R' are selected from the group consisting of allyl, lower alkyl and lower haloalkyl radicals, and $R_2$, $R_3$, and $R_4$ are lower alkylene or lower haloalkyl radicals, provided that either $R_2$ or $R_3$ must be an alkylene radical.

18 Claims, No Drawings

VINYL URETHANE RESINS FROM HALOGENATED DIOLS AND PHOSPHONATE DIOLS

BACKGROUND OF THE INVENTION

1. Field of the Invention

The present invention relates generally to vinyl urethane resins, to compositions useful in the preparation of said resins, and to methods of preparing said resins. More particularly, the present invention relates to vinyl urethane resins which are both fire retardant and have improved physical properties, such as increased tensile strength, elongation, flexural strength, and charpy impact. These resins are prepared by reacting a halogen-containing diol, an isocyanate, a hydroxyl-terminated ester of acrylic or methacrylic acid, and a phosphonate having the following general formula:

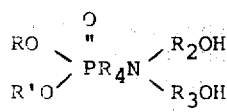

wherein R and R' are selected from the group consisting of allyl, lower alkyl and lower haloalkyl radicals, and $R_2$, $R_3$, and $R_4$ are lower alkylene or lower haloalkyl radicals, provided that either $R_2$ or $R_3$ must be an alkylene radical.

2. Description of the Prior Art

Urethanes prepared by reacting an isocyanate and an active hydrogen-containing compound are well known in the art. The active hydrogen-containing compounds employed may be any of a wide variety of materials, including both polyesters and polyethers.

Vinyl urethane resins prepared by reacting an isocyanate, a polyol, and a hydroxyl-terminated ester of acrylic or methacrylic acid are also known in the art. However, for certain applications, it would be desirable to improve the physical properties of these resins.

In accordance with the present invention, vinyl urethane resins which are both fire retardant and have improved physical properties have been prepared.

SUMMARY OF THE INVENTION

In accordance with the present invention, fire-retardant vinyl urethane resins having improved physical properties are prepared from a composition comprising, in addition to a halogen-containing diol, an isocyanate, and a hydroxyl-terminated ester of acrylic or methacrylic acid, a phosphonate having the following general formula:

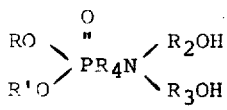

wherein R and R' are selected from the group consisting of allyl, lower alkyl and lower haloalkyl radicals, and $R_2$, $R_3$, and $R_4$ are lower alkylene or lower haloalkyl radicals, provided that either $R_2$ or $R_3$ must be an alkylene radical. In addition to being fire retardant, vinyl urethane resins prepared from these compositions have significantly improved physical properties such as tensile strength, flexural strength, elongation, and charpy impact values.

DESCRIPTION OF THE PREFERRED EMBODIMENTS

As mentioned above, in accordance with the present invention, vinyl urethane resins having unexpectedly improved physical properties have been prepared by including in the composition used to prepare said resins a phosphonate as hereinafter defined. The resins of the present invention are prepared from a composition comprising:

a. a halogen-containing diol;
b. an isocyanate;
c. a hydroxyl-terminated ester of acrylic or methacrylic acid; and
d. a phosphonate having the following general formula:

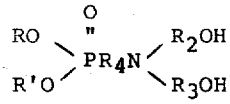

wherein R, R', $R_2$, $R_3$, and $R_4$ are as defined above. Each of these components and the methods of preparing and utilizing the resins of the present invention are described in detail below.

To assist in describing the invention so that it may be understood by those skilled in the art, but without wishing to be bound by any particular theory, it is believed that the vinyl urethane resins prepared in accordance with the present invention may be represented by the following formula:

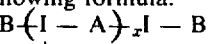

wherein
B is the residue of the hydroxyl-terminated ester of acrylic or methacrylic acid,
I is the residue of the isocyanate,
A is the residue of the halogen-containing diol and the phosphonate, and
x is an integer equal to at least 1.

Halogen-containing Diol

The halogen-containing diols which may be employed in preparing the vinyl urethane resins of the present invention include both aromatic and aliphatic compounds containing at least 2 hydroxyl groups and 1 halogen substituent. Preferred halogen substituents include bromine and chlorine. Preferred results are achieved with a diol having a halogen content of from about 25 percent to about 70 percent by weight based on the total weight of the diol.

Preferred halogen-containing diols are prepared by reacting a halogenated dihydric alcohol with an alkylene oxide such as ethylene oxide or propylene oxide. These materials have the following general formula:

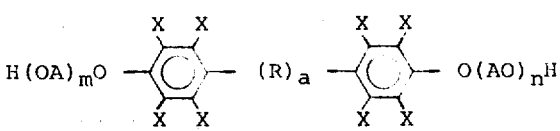

wherein each X is selected from the group consisting of hydrogen and halogen with the proviso that at least one X must be equal to halogen; R is selected from the group consisting of alkylidene and cycloalkylidene radicals containing from about 1 to about 6 carbon atoms, oxygen, sulfur and divalent radicals represented by the formulae:

$$C = O, \quad S = O, \quad \text{or} \quad O = S = O;$$

a is an integer equal to either 0 or 1; A is an alkylene radical containing from 2 to 4 carbon atoms; and m and n are integers each of which is equal to at least 1 and the sum of which is equal to from at least 2 to about 6. It has been found that, if R or A in the above-mentioned formula contain more than the indicated number of carbon atoms, the fire retardancy of the resins is decreased to an impractical level. Thus, even though the other properties of the resins are improved over those which do not contain the phosphonate additive, these materials are not preferred.

An especially preferred halogen-containing diol for use in preparing the resins of the present invention has the following general formula:

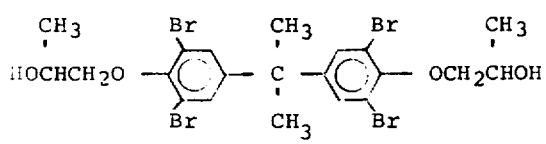

Other halogen-containing diols may also be employed including, for example, the following:

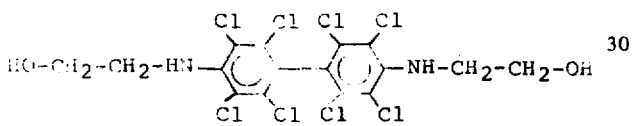

identified as bis(2-hydroxyethylamino)-octachlorobiphenyl;

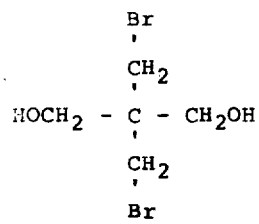

identified as dibromoneopentyl glycol; and the diol identified as Firemaster PHT4-diol available from Michigan Chemical Corporation, Chicago, Illinois, having the following general formula:

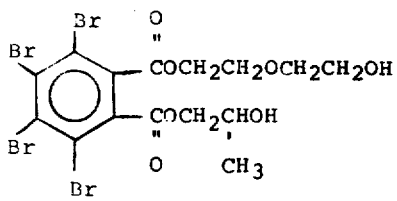

Hydroxyl-terminated Ester

The resin compositions of the present invention also include a hydroxyl-terminated ester of acrylic or methacrylic acid. The preferred materials are the hydroxyalkyl esters having the following general formula:

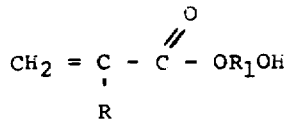

wherein $R_1$ is an alkyl group containing from 2 to about 4 carbon atoms and R is hydrogen or methyl. These materials are prepared by reacting acrylic acid or methacrylic acid with an alkylene oxide selected from the group consisting of ethylene oxide, propylene oxide, and butylene oxide. This reaction is carried out in accordance with methods which are well known in the art. Hydroxyalkyl esters which may be employed include, for example, hydroxyethyl acrylate, hydroxyethyl methacrylate, hydroxypropyl acrylate, hydroxypropyl methacrylate, hydroxybutyl acrylate, and hydroxybutyl methacrylate.

Other hydroxyl-terminated esters which may be employed include, for example, those prepared by reacting one of the above-mentioned halogen-containing diols with acrylic or methacrylic acid. These materials are generally prepared by reacting the acid and diol in equimolar amounts resulting in an ester having the above formula wherein $R_1$ is derived from the halogen-containing diol. Representative of this type of ester are compounds having the above-mentioned formula wherein $R_1$ is, for example,

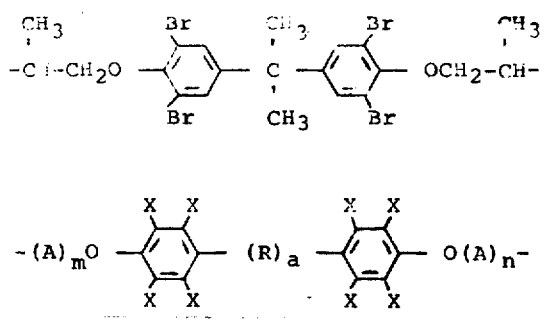

wherein R, a, x, A, m and n are as hereinabove defined.

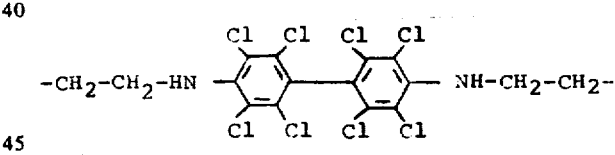

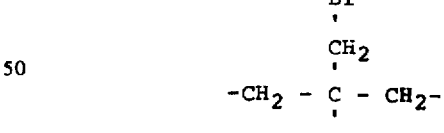

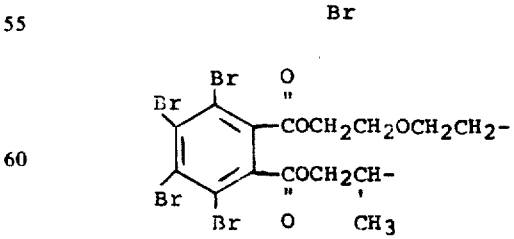

Phosphonate

In accordance with the present invention, it has been found that the physical properties of the vinyl urethane resins are significantly improved when there is also included in the resin-forming composition a phosphonate having the following general formula:

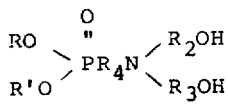

wherein R and R' are selected from the group consisting of allyl, lower alkyl and lower haloalkyl radicals, and $R_2$, $R_3$, and $R_4$ are lower alkylene or lower haloalkyl radicals, provided that either $R_2$ or $R_3$ must be an alkylene radical.

The phosphonates may be prepared as described in U.S. Pat. No. 3,076,010 issued to Beck et al. As described in that patent, the disclosure of which is incorporated herein by reference, dialkyl dialkanolamino alkylphosphonates are prepared by reacting a dialkanolamine, an aldehyde or ketone and a dialkyl phosphite. Dialkanolamines which may be employed include, for example, diethanolamine, dipropanolamine, ethanol propanolamine, dibutanolamine, dioctanolamine and the like. Representative aldehydes or ketones include compounds such as formaldehyde, acetaldehyde, butyraldehyde, furfural, acetone, methyl ethyl ketone, and the like. Dialkyl phosphites which may be employed include, for example, dimethyl phosphite, diethyl phosphite, methyl ethyl phosphite, dipropyl phosphite dibutyl phosphite, dioctyl phosphite, and haloalkyl phosphites such as di-(beta-chloroethyl)-phosphite, di-beta-fluoroethyl)phosphite, di-(beta-bromoethyl)phosphite, and the like.

When a phosphonate wherein $R_4$ is a haloalkyl radical is prepared, a halogenated aldehyde such as dibromobutyraldehyde is employed. Similarly, in the preparation of a material wherein either $R_2$ or $R_3$ is a haloalkyl radical, an alkanol haloalkanolamine such as ethanol chloropropanolamine is utilized.

The preferred vinyl urethane resins of the present invention are those containing a phosphonate having the following formula:

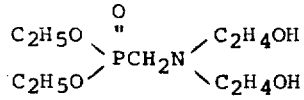

The preparation of vinyl urethanes having the unexpectedly improved physical properties described above depends, to a considerable extent, on the amount of phosphonate employed. To produce satisfactory resins, it has been found to be critical to employ an amount of phosphonate such that the molar ratio of diol to phosphonate is equal to from about 0.4/0.6 to about 0.9/0.1.

Isocyanate

Isocyanates which may be employed in preparing the resins of the present invention include those isocyanates which are known in the art and which have a functionality equal to from about 2.0 to about 3.0. As used herein, the term "functionality" refers to the average number of isocyanate (NCO) groups per molecule. In accordance with the present invention, both aromatic and aliphatic isocyanates may be employed. While, for most applications, it is preferred to employ only one isocyanate in each resin composition, resins may also be prepared from a combination of 2 or more isocyanates. Representative isocyanates which may be employed in carrying out the present invention include, for example, toluene diisocyanate; diphenyl methane diisocyanate; 2,4,4-(2,2,4-)trimethyl hexamethylene diisocyanate; 4,4'-methylene-bis(cyclohexyl isocyanate); xylylene diisocyanate; 3-isocyanate methyl-3,5,5-trimethyl-cyclohexyl isocyanate; hexamethylene diisocyanate; and those represented by the following formulae:

(a) 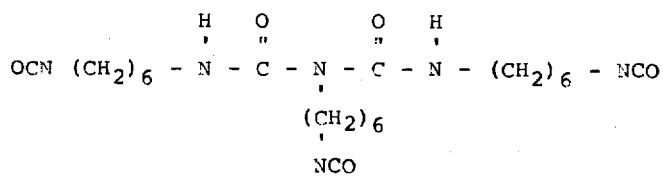

(b) 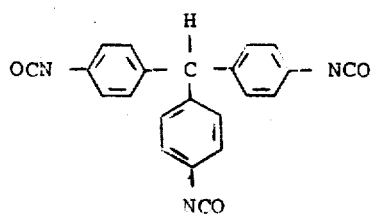

(c) 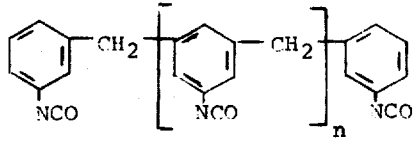   n = from about 0.1 to about 1.0

(d)

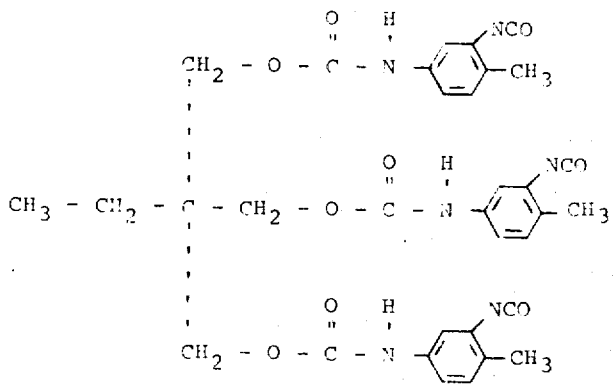

Compounds (a), (b), (c), and (d) are known, respectively, by the trade names Desmodur N, Mondur R, PAPI, and Mondur CB.

The amounts of the various components which are preferably employed in preparing the resins of the present invention may be described as follows:

As mentioned above, the halogen-containing diol and phosphonate are employed in amounts such that the molar ratio of the diol to the phosphonate is equal to from about 0.4/0.6 to about 0.9/0.1.

The preferred resins of the present invention are those wherein the total amount of diol and phosphonate is equal to up to one mol. In this case, there should also be utilized about 2 mols of isocyanate and about 2 mols of the hydroxyl-terminated ester of acrylic or methacrylic acid per mol of combined diol and phosphonate. Thus, if the total mols of diol and phosphonate are represented by $x$ where $x$ is an integer equal to up to 1.0, the amount of isocyanate and hydroxyl-terminated ester which should be utilized are each equal to $2x$ mols. The following table illustrates these relationships:

TABLE 1

| Diol (mols) | Phosphonate (mols) | Total Mols | Isocyanate (mols) | OH-Terminated Ester (mols) |
| --- | --- | --- | --- | --- |
| 0.4 | 0.6 | 1 | 2 | 2 |
| 0.05 | 0.05 | 0.1 | 0.2 | 0.2 |
| 0.25 | 0.25 | 0.5 | 1 | 1 |

Alternatively, resins may be prepared wherein the total amount of halogen-containing diol and phosphonate is equal to greater than one mol. In this case, the amount of isocyanate is equal to about one plus the total mols of diol and phosphonate and the amount of hydroxyl-terminated ester of acrylic or methacrylic acid is equal to about 2 mols. Thus, if the total mols of diol and phosphonate are represented by $y$ where $y$ is an integer equal to at least 1.1, the amount of isocyanate which should be utilized is equal to about $y + 1$ mols and the amount of hydroxyl-terminated ester is equal to about 2 mols. These relationships are illustrated in the following table:

TABLE 2

| Diol (mols) | Phosphonate (mols) | Total Mols | Isocyanate (mols) | OH-Terminated Ester (mols) |
| --- | --- | --- | --- | --- |
| 0.75 | 0.75 | 1.5 | 2.5 | 2 |
| 0.8 | 1.2 | 2 | 3 | 2 |
| 2.7 | 0.3 | 3 | 4 | 2 |

Although either more than or less than the above-mentioned amounts of components may be employed in the preparation of resins in accordance with the present invention, such resins will contain either an excess of free hydroxyl or isocyanate (-NCO) groups. These resins are not preferred due to the fact that excess isocyanate groups result in a resin which is not stable when stored, whereas those having an excess of hydroxyl groups have poorer corrosion resistant properties.

As mentioned above, the isocyanates employed in the preparation of the resins of the present invention may contain more than about 2.0 isocyanate groups per mol — i.e., they may have a functionality greater than about 2.0. When such an isocyanate is employed, there results an excess of free isocyanate (NCO) groups in the resins. This free NCO functionality causes the products to be unstable. It is, therefore, preferred to react the excess isocyanate groups with a hydroxyl-containing compound. In this regard, it has been found that preferred results are achieved when the excess isocyanate is reacted with a halogenated monoalcohol or an additional quantity of a hydroxyl-terminated ester of acrylic or methacrylic acid. Suitable halogenated monoalcohols which may be employed include, for example, 2,3-dibromopropanol, 1-dendro-pentabromophenol, 3-bromo-neopentyl alcohol, and 1,2-dendropentachlorophenol. Also, any of the hydroxyl-terminated esters of acrylic or methacrylic acid discussed above may be employed. The amount of hydroxyl-containing compound employed is determined by the functionality of the isocyanate employed. Generally, the mols of this compound employed per mol of isocyanate is equal to $2X$ where X is the functionality of the isocyanate minus 2.0. Thus, if one mol of an isocyanate having a functionality of 2.1 is utilized, the amount of hydroxyl-containing compound employed is 0.2 mol. Similarly, for each mol of an isocyanate having a functionality of 3.0, there is included 2.0 mols of the hydroxyl-containing compound. This amount of the hydroxyl-containing compound is sufficient to neutralize the excess functionality — i.e., that above 2.0 — of the isocyanate.

The vinyl urethane resins of the present invention may be prepared by any one of a variety of methods. Especially preferred results have been achieved utilizing one of the monomers described below as a solvent. However, this is not essential to the preparation of the resins of the present invention and resins may be prepared employing a melt technique — i.e., one in which no additional solvent is utilized. The vinyl urethane resins may be prepared, for example, by reacting the isocyanate with a mixture of the diol and the phosphonate and, subsequently, combining the product thereof with the hydroxyl-terminated acrylate or methacrylate. In an especially preferred method, the halogenated diol, the hydroxyl-terminated ester of acrylic or methacrylic acid, and the phosphonate are combined and the isocyanate added to the mixture or, alternatively, the mixture added to the isocyanate. Alternatively, the isocyanate may first be reacted with a hydroxyl-containing compound such as a halogenated monoalcohol to reduce the functionality of the isocyanate to 2.0 and the product thereof reacted with a mixture of the halogenated diol and the phosphonate followed by a subsequent reaction with the hydroxyl-terminated ester. Finally, the hydroxyl-terminated ester of acrylic or methacrylic acid may be reacted first with the isocyanate and the product thereafter reacted with a mixture of the halogenated diol and the phosphonate.

The resulting vinyl urethane resins are particularly useful in compositions wherein they are cross-linked with a monomer. Representative monomers which may be employed include, for example, styrene, t-butyl styrene, α-methyl styrene, chlorostyrene, divinyl benzene, acrylic acid, dimethyl maleate, dibutyl fumarate, butyl methacrylate, nonyl methacrylate, allyl alcohol, and the like. Of these, it is especially preferred to employ styrene. As mentioned above, if desired, the monomer may be utilized as a solvent in preparing the resin.

The resin, particularly when prepared as a solution in a suitable monomer, may contain any of the additives which are conventionally employed in such materials. To improve the storage stability of the solution, from about 0.01 to about 0.2 percent of a polymerization inhibitor such as tertiary butyl catechol or hydroquinone may be employed. Other additives which may also be employed include, for example, antioxidants, UV absorbers, dyes, pigments, and catalysts.

The resins of the present invention have been found to be particularly useful in applications such as castings, coatings, and laminates where it is desirable to have both fire retardancy and improved physical properties such as high tensile strength, elongation and hardness. They are useful in a variety of filament-wound products such as pipes, ducts, and storage tanks and in molded products where they may be combined with fillers and fibers.

Suprasec DN refers to a polymethylene polyphenyl isocyanate having a functionality of 2.8 available from ICI America Inc.

Fyrol 6 refers to diethyl N,N-bis(2-hydroxyethyl) aminomethyl phosphonate having the following formula:

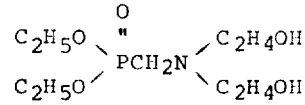

available from Stauffer Chemical Company, New York.

Diol 111 refers to a polyol having the following formula:

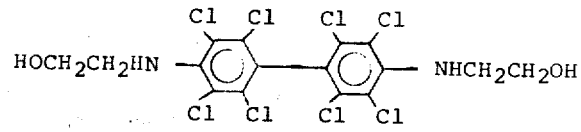

available from Wyandotte Chemicals Corporation, Wyandotte, Michigan.

Firemaster PHT4-diol refers to a polyol having the following formula:

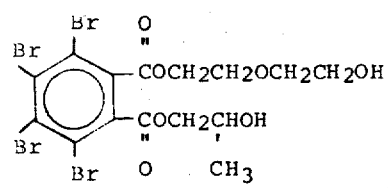

available from Michigan Chemical Corporation, Chicago, Illinois.

Diol A refers to 2-prodendro tetrabromo bisphenol A. This material is prepared by reacting 2 mols of propylene oxide with 1 mol of tetrabromo bisphenol A.

Methacrylate A refers to a material prepared by reacting one mol of Diol A and one mol of methacrylic acid. This material may be represented by the following formula:

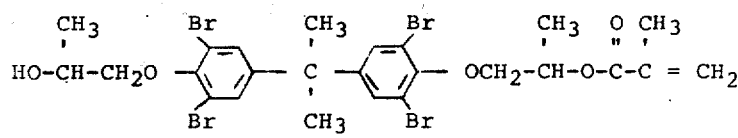

In order to describe the present invention so that it may be more clearly understood, the following examples are set forth. These examples are set forth primarily for the purpose of illustration and any enumeration of detail contained therein should not be interpreted as a limitation on the concept of the present invention.

The following materials are used in the examples:

Mondur MR refers to a polymethylene polyphenyl isocyanate having a functionality of 2.6 available from Mobay Chemical Company.

TDI refers to toluene diisocyanate which is generally a mixture of the 2,4 and 2,6 isomers.

PAPI refers to a polymethylene polyphenyl isocyanate having a functionality of 3.0 available from The Upjohn Company.

The hydroxyethyl methacrylate employed had a purity equal to 96 percent by weight.

Castings were prepared by pouring the resin composition into a mold comprising 2 glass plates, each of which had previously been coated with a mold release agent, spaced ⅛ inch apart, and sealed together on 3 edges. After the composition was poured into the mold, the fourth edge was sealed and the composition was allowed to cure at room temperature for 24 hours. At the end of this time, the material was post-cured by placing the mold in an oven at 100°C. for 4 hours. After cooling, the glass plates were separated and the solid casting was removed and tested.

Tensile strength was measured in accordance with A.S.T.M. Standard D-638-71a.

Flexural strength was measured in accordance with A.S.T.M. Standard D-790-71.

Elongation was measured in accordance with A.S.T.M. Standard D-638-71a.

Heat distortion temperature (HDT) was measured in accordance with A.S.T.M. Standard D-648-72.

Charpy impact was determined in accordance with A.S.T.M. Standard D-256.

G. E. Candle was measured in accordance with A.S.T.M. Standard D-2863-70.

EXAMPLE 1

Into a 3-liter reaction flask equipped with a stirrer, nitrogen inlet tube, thermometer, dropping funnel, and condenser, there was added 717 grams (2.1 mols) of Mondur MR, 717 grams of styrene, and 0.3 gram of dibutyl tin dilaurate catalyst. The reaction mixture was heated to 60°C. at which time there was added a solution comprising 337 grams (0.52 mol) of Diol A, 337 grams of styrene, and 131 grams (0.52 mol) of Fyrol 6. This material was added over a period of 1¼ hours at a rate such that the temperature of the reaction mixture did not exceed 70°C. After the addition was completed, the reaction mixture was maintained at a temperature from 60°C. to 70°C. for 3 hours. At the end of this time, a solution of 453 grams (3.3 mols) of hydroxyethyl methacrylate, 8.0 grams of styrene, and 0.3 gram of dibutyl tin dilaurate were added dropwise over a 1 hour period at a rate such that the reaction temperature did not exceed 70°C. After the addition was completed, the solution was maintained at a temperature of from 60°C. to 70°C. until the percent free NCO was below 0.5 percent, as indicated by titration employing the method described in Union Carbide Bulletin F-41146 entitled "Urethane Coatings Chemicals" at page 24. At this time, the reaction was cooled.

A composition was prepared comprising:
400 grams of the above-identified resin,
1.6 grams of cobalt naphthenate containing 6 percent by weight cobalt,
2.4 grams of a 60 percent solution of methyl ethyl ketone peroxide in dimethyl phthalate,
2.0 grams of a 1 percent solution of tertiary butyl catechol in styrene, and
20 grams of antimony trioxide.

Castings were prepared from the above-identified composition. The castings had the following physical properties:

| | |
|---|---|
| Tensile strength (psi) | 7,900 |
| Flexural strength (psi) | 20,500 |
| Elongation (%) | 1.68 |
| Charpy impact | 4.34 |
| HDT (°C.) | 113 |
| G. E. candle | 24.9 |

EXAMPLE 2

A vinyl urethane resin was prepared from:

| | | |
|---|---|---|
| Mondur MR | 1.96 mols | 671 grams |
| Diol A | 0.49 mols | 316 grams |
| Fyrol 6 | 0.49 mols | 122 grams |
| Hydroxyethyl methacrylate | 1.96 mols | 265 grams |
| 2,3-dibromopropanol | 1.18 mols | 257 grams |

The following procedure was employed:

Into the reaction flask described in Example 1, there was added a solution comprising:
671 grams of Mondur MR,
200 grams of styrene, and
0.3 gram of dibutyl tin dilaurate.

The solution was heated to 60°C. and there was then added dropwise a solution comprising:
316 grams of Diol A,
316 grams of styrene,
122 grams of Fyrol 6, and
200 grams of styrene. This solution was added over a period of 1 hour at a rate such that the temperature of the reaction mixture did not exceed 70°C. When the addition was completed, an additional 100 grams of styrene were added to remove any residual materials from the dropping funnel. The temperature of the resulting reaction mixture was maintained at between 60°C. and 70°C. for 3 hours. At the end of this time, there was added a solution comprising:
265 grams of hydroxyethyl methacrylate,
257 grams of 2,3-dibromopropanol,
100 grams of styrene, and
0.3 gram of dibutyl tin dilaurate.

This solution was also added dropwise over a period of 1 hour at a rate such that the temperature of the reaction mixture did not exceed 70°C. When the addition was complete, the dropping funnel was again washed with 153 grams of styrene. The temperature of the reaction mixture was maintained at from 60°C. to 70°C. until the percent free NCO was below 0.5 percent. When this percent was 0.36, the reaction mixture was cooled.

A composition was prepared comprising:
400 grams of the resin prepared above,
1.6 grams of cobalt naphthenate containing 6 percent by weight cobalt,
3.2 grams of a 60 percent solution of methyl ethyl ketone peroxide in dimethyl phthalate, and
2.4 grams of a 1 percent solution of t-butyl catechol in styrene.

Castings prepared from this composition had the following physical properties:

| | |
|---|---|
| Tensile strength (psi) | 9,600 |
| Flexural strength (psi) | 20,100 |
| Elongation (%) | 2.07 |
| Charpy impact | 5.81 |
| HDT (°C.) | 91 |
| G. E. candle | 29.4 |
| Barcol | 41–42 |

EXAMPLE 3

A vinyl urethane resin is prepared by reacting:

| | | |
|---|---|---|
| Mondur MR | 1.86 mols | 637 grams |
| Diol A | 0.66 mols | 424 grams |
| Fyrol 6 | 0.28 mols | 70 grams |
| Hydroxyethyl methacrylate | 1.88 mols | 254 grams |
| 2,3-dibromopropanol | 1.13 mols | 246 grams |

The following procedure is employed:

Into the reaction flask described in Example 1, there is added a solution comprising:
637 grams of Mondur MR,
400 grams of styrene, and
0.3 gram of dibutyl tin dilaurate.

The solution is heated to 60°C. and there is then added dropwise a solution comprising:
424 grams of Diol A,
70 grams of Fyrol 6,
254 grams of hydroxyethyl methacrylate,
246 grams of 2,3-dibromopropanol,
500 grams of styrene, and
0.3 gram of dibutyl tin dilaurate.

This solution is added over a period of 2 hours at a rate such that the temperature of the reaction mixture does not exceed 70°C. When the addition is completed, an additional 169 grams of styrene are added to remove any residual material from the dropping funnel. The temperature of the reaction mixture is maintained at from 60°C. to 70°C. until the percent free NCO is below 0.5 percent. At this time, the reaction mixture is cooled resulting in a resin having a percent free NCO of 0.36. There is then added 1.35 grams of tertiary butyl catechol and the reaction mixture is cooled.

A composition is prepared comprising:
400 grams of the resin prepared above,
4.0 grams of cobalt naphthenate containing 6 percent by weight cobalt,
3.2 grams of a 60 percent solution of methyl ethyl ketone peroxide in dimethyl phthalate, and
0.8 gram of a 1 percent solution of tertiary butyl catechol in styrene.

Castings prepared from this composition have improved physical properties such as tensile strength, flexural strength, elongation, charpy impact, Barcol hardness, heat distortion temperature, and G. E. candle rating when compared with an identical casting prepared from a resin which does not contain Fyrol 6.

EXAMPLE 4

A vinyl urethane resin is prepared comprising:

| Rubinate M | 1.77 mols | 607 grams |
| Firemaster PHT4-Diol | 0.54 mols | 351 grams |
| Fyrol 6 | 0.35 mols | 89 grams |
| Hydroxyethyl methyacrylate | 1.76 mols | 238 grams |
| 3-bromo-neopentyl alcohol | 1.05 mols | 343 grams |

Into the reaction flask described in Example 1, there is added a solution comprising:
238 grams of hydroxyethyl methacrylate,
89 grams of Fyrol 6,
351 grams of Firemaster PHT4-Diol,
500 grams of styrene, and
0.3 grams of dibutyl tin dilaurate.

The solution is heated to 60°C. and there is then added dropwise a solution comprising:
607 grams of Rubinate M,
400 grams of styrene, and
0.3 grams of dibutyl tin dilaurate.

This solution is added at a rate such that the temperature of the reaction mixture does not exceed 70°C. When the addition is completed, an additional 172 grams of styrene is added to remove any residual materials from the dropping funnel. The temperature of the resulting reaction mixture is maintained at between 60°C. and 70°C. until the percent free NCO is below 0.5 percent. At this time, the reaction mixture is cooled resulting in a resin having a final percent free NCO of 0.44 percent. There is then added 1.35 grams of tertiary butyl catechol.

A composition is prepared comprising:
400 grams of the resin prepared above,
3.2 grams of cobalt naphthenate containing 6 percent by weight cobalt,
4.0 grams of a 60 percent solution of methyl ethyl ketone peroxide in dimethyl phthalate, and
3.2 grams of a 1 percent solution of tertiary butyl catechol in styrene.

Castings prepared from this composition have improved physical properties such as tensile strength, flexural strength, elongation, charpy impact, heat distortion temperature, G. E. candle rating, and Barcol hardness when compared with a casting prepared from an identical resin that does not contain Fyrol 6.

EXAMPLE 5

A vinyl urethane resin is prepared comprising:

| Mondur MR | 1.63 mols | 559 grams |
| Diol A | 0.33 mols | 211 grams |
| Fyrol 6 | 0.48 mols | 122 grams |
| Hydroxyethyl methacrylate | 1.63 mols | 221 grams |
| 1.2-dendro-pentabromophenol | 0.96 mols | 516 grams |

Into the reaction flask described in Example 1, there is added a solution comprising:
558 grams of Mondur MR,
200 grams of styrene, and
0.3 gram of dibutyl tin dilaurate.

The solution is heated to 60°C. and there is then added dropwise a solution comprising:
516 grams of 1.2-dendro-pentabromophenol, and
300 grams of styrene.

This solution is added at a rate such that the temperature of the reaction mixture does not exceed 70°C. When the addition is completed, an additional 100 grams of styrene are added to remove any residual materials from the dropping funnel. At the end of this time, there is added a third solution comprising:
211 grams of Diol A,
122 grams of Fyrol 6, and
200 grams of styrene.

This solution is also added dropwise at a rate such that the temperature of the reaction mixture does not exceed 70°C. When the addition is completed, the dropping funnel is again washed with 100 grams of styrene. The temperature of the reaction mixture is maintained at from 60°C. to 70°C. for 3 hours. At the end of this time, there is added a fourth solution comprising:
221 grams of hydroxyethyl methacrylate,
100 grams of styrene, and
0.3 gram of dibutyl tin dilaurate.

This solution is also added at a rate such that the temperature of the reaction mixture does not exceed 70°C. When the addition is completed, an additional 72 grams of styrene are added to remove any residual materials from the dropping funnel. The temperature of the resulting reaction mixture is maintained at between 60°C. and 70°C. until the percent free NCO is below 0.5. At this time, there is added 1.35 grams of tertiary butyl catechol and the reaction mixture is cooled.

A composition is prepared comprising:
400 grams of the resin prepared above,
3.6 grams of cobalt naphthenate containing 6 percent by weight cobalt,
3.6 grams of a 60 percent solution of methyl ethyl ketone peroxide in dimethyl phthatlate, and 1.6 grams of a 1 percent solution of tertiary butyl catechol in styrene.

Castings prepared from this composition have improved physical properties such as tensile strength, flexural strength, elongation, charpy impact, heat distortion temperature, G. E. candle rating, and Barcol hardness when compared with a casting prepared from a similar resin prepared without Fyrol 6.

EXAMPLE 6

A vinyl urethane resin is prepared comprising:

| | | |
|---|---|---|
| Suprasec DN | 1.8 mols | 749 grams |
| Diol 111 | 0.45 mols | 251 grams |
| Fyrol 6 | 0.45 mols | 113 grams |
| Hydroxyethyl methacrylate | 1.6 mols | 213 grams |
| 2,3-dibromopropanol | 1.4 mols | 311 grams |

Into the reaction flask as described in Example 1, there is added a solution comprising:
  740 grams of Suprasec DN,
  400 grams of styrene, and
  0.3 gram of dibutyl tin dilaurate.
The solution is heated to 60°C. and there is then added dropwise a solution comprising:
  213 grams of hydroxyethyl methacrylate,
  311 grams of 2,3-dibromopropanol, and
  200 grams of styrene.
This solution is added over a period of 2 hours at a rate such that the temperature of the reaction mixture does not exceed 70°C. When the addition is completed, an additional 100 grams of styrene are added to remove any residual materials from the dropping funnel. There is then added a solution comprising:
  251 grams of Diol 111,
  113 grams of Fyrol 6,
  200 grams of styrene, and
  0.3 gram of dibutyl tin dilaurate.
This solution is also added dropwise at a rate such that the temperature of the reaction mixture does not exceed 70°C. When the addition is completed, the dropping funnel is again washed with 172 grams of styrene. The temperature of the reaction mixture is maintained at from 60°C. to 70°C. until the percent free NCO is below 0.5 percent. When this percent is 0.30, there is added 1.35 grams of tertiary butyl catechol and the reaction mixture is cooled.

A composition is prepared comprising:
  400 grams of the resin prepared above,
  2.4 grams of cobalt naphthenate containing 6 percent by weight cobalt,
  3.2 grams of a 60 percent solution of methyl ethyl ketone peroxide in dimethyl phthalate, and
  2.4 grams of a 1 percent solution of tertiary butyl catechol in styrene.

Castings prepared from this composition have improved physical properties such as tensile strength, flexural strength, elongation, charpy impact, heat distortion temperature, G. E. candle rating, Barcol hardness when compared with a casting prepared from a similar resin that does not contain Fyrol 6.

EXAMPLE 7

A vinyl urethane resin is prepared comprising:

| | | |
|---|---|---|
| Mondur MR | 1.41 mols | 486 grams |
| Diol A | 0.35 mols | 230 grams |
| Phosphonate* | 0.35 mols | 114 grams |
| Hydroxyethyl methacrylate | 1.42 mols | 192 grams |
| 2,3-dibromopropanol | 0.85 mols | 186 grams |

*The phosphonate employed in this example is identified as bis(betachloroethyl)N,N'-diethanolaminoethyl phosphonate. This material is prepared as described in Example 4 of U.S. 3,076,010.

Into the reaction flask described in Example 1, there is added a solution comprising:
  230 grams of Diol A,
  114 grams of phosphonate,
  192 grams of hydroxyethyl methacrylate,
  186 grams of 2,3-dibromopropanol,
  0.3 gram of dibutyl tin dilaurate, and
  400 grams of styrene.
The solution is heated to 60°C. and there is then added dropwise a solution comprising:
  486 grams of Mondur MR, and
  392 grams of styrene.
This solution is added over a period of 1 hour at a rate such that the temperature of the reaction mixture does not exceed 70°C. When the addition is completed, the temperature of the reaction mixture is maintained at between 60°C. and 70°C. until the percent free NCO is below 0.5 percent. At this time, the reaction mixture is cooled.

A composition is prepared comprising:
  400 grams of the resin prepared above,
  1.6 grams of cobalt naphthenate containing 6 percent by weight cobalt,
  2.4 grams of a 60 percent solution of methyl ethyl ketone peroxide in dimethyl phthalate, and
  20 grams of antimony trioxide.

Castings prepared from this composition have improved physical properties such as tensile strength, flexural strength, elongation, charpy impact, heat distortion temperature, G. E. candle rating, and Barcol hardness when compared with a casting prepared from an identical resin that does not contain the phosphonate.

EXAMPLE 8

A vinyl urethane resin is prepared comprising:

| | | |
|---|---|---|
| Mondur MR | 2.0 mols | 686 grams |
| Diol A | 0.5 mols | 322.5 grams |
| Fyrol 6 | 0.5 mols | 125 grams |
| Hydroxyethyl methacrylate | 2.0 mols | 271 grams |
| 2,3-dibromopropanol | 1.2 mols | 262 grams |

The following procedure is employed:
Into the reaction flask described in Example 1, there is added a solution comprising:
  686 grams of Mondur MR,
  200 grams of styrene, and
  0.3 gram of dibutyl tin dilaurate.
This solution is heated to 60°C. and there is then added dropwise a solution comprising:
  322.5 grams of Diol A,
  322.5 grams of styrene,
  125 grams of Fyrol 6, and
  200 grams of styrene.
This solution is added over a period of 1 hour at a rate such that the temperature of the reaction mixture does not exceed 70°C. When the addition is completed, an additional 100 grams of styrene is added to remove any residual materials from the dropping funnel. The temperature of the reaction mixture is maintained at between 60°C. and 70°C. for 3 hours. At the end of this time, there is added a solution comprising:
271 grams of hydroxyethyl methacrylate,
262 grams of 2,3-dibromopropanol,
100 grams of styrene, and
0.3 gram of dibtyl tin dilaurate.

This solution is also added dropwise over a period of 1 hour at a rate such that the temperature of the reaction mixture does not exceed 70°C. When the addition is completed, the dropping funnel is again washed with 271.5 grams of styrene. The temperature of the reaction mixture is maintained at from 60°C. to 70°C. until the percent free NCO is below 0.5 percent. At this time, the reaction mixture is cooled and the resin removed from the flask.

A compositiom is prepared comprising:
400 grams of the resin prepared above,
1.6 grams of cobalt naphthenate containing 6 percent by weight cobalt,
3.2 grams of a 60 percent solution of methyl ethyl ketone peroxide in dimethyl phthalate, and
2.4 grams of a 1 percent solution of t-butyl catechol in styrene.

Castings prepared from this composition have improved physical properties, particularly, tensile strength, flexural strength, elongation, charpy impact, heat distortion temperature, G. E. candle rating, and Barcol hardness, when compared with castings prepared from a similar resin that does not contain Fyrol 6.

EXAMPLE 9

A vinyl urethane resin is prepared by reacting:

| | | | |
|---|---|---|---|
| Mondur MR | 1.09 mols | 375 | grams |
| Diol A | 0.27 mols | 176.4 | grams |
| Fyrol 6 | 0.27 mols | 68.4 | grams |
| Hydroxyethyl methacrylate | 1.09 mols | 148 | grams |
| Methacrylate A | 0.66 mols | 438 | grams |

The following procedure is employed:
Into the reaction flask described in Example 1, there is added a solution comprising:
176.4 grams of Diol A,
68.4 grams of Fyrol 6,
148 grams of hydroxyethyl methacrylate,
438 grams of Methacrylate A,
400 grams of styrene, and
0.3 gram of dibutyl tin dilaurate.

The solution is heated to 60°C. and there is then added dropwise a solution comprising:
375 grams of Mondur MR, and
394.2 grams of styrene.

This solution is added at a rate such that the temperature of the reaction mixture does not exceed 70°C. When the addition is completed, the reaction mixture is maintained at 60°C. until the percent free NCO is less than 0.5 percent. At this point, the reaction mixture is cooled and the resin removed from the flask.

A composition is prepared comprising:
400 grams of the resin prepared above,
20 grams of antimony trioxide,
3.2 grams of cobalt naphthenate containing 6 percent by weight cobalt, and
6 grams of a 60 percent solution of methyl ethyl ketone peroxide in dimethyl phthalate.

Castings prepared from this composition have improved physical properties such as tensile strength, flexural strength, elongation, charpy impact, Barcol hardness, heat distortion temperature, and G. E. candle rating when compared with an identical casting prepared from a resin which does not contain Fyrol 6.

EXAMPLE 10

A vinyl urethane resin was prepared comprising:

| | | |
|---|---|---|
| TDI | 2.14 mols | 372 grams |
| Diol A | 0.71 mols | 466 grams |
| Fyrol 6 | 0.71 mols | 178 grams |
| Hydroxyethyl methacrylate | 1.42 mols | 192 grams |

The following procedure was employed:
Into the reaction flask described in Example 1, there was added a solution comprising:
466 grams of Diol A,
178 grams of Fyrol 6,
192 grams of hydroxyethyl methacrylate,
600 grams of styrene, and
1.0 gram of t-butyl catechol.

The solution was heated to 60°C. and there was then added dropwise a solution comprising:
372 grams of TDI, and
192 grams of styrene.

This solution was added at a rate such that the temperature of the reaction mixture did not exceed 75°C. When the addition was completed, the temperature of the reaction mixture was maintained at from 60°C. to 70°C. until the percent free NCO was below 0.5 percent. At this time, the reaction mixture was cooled.

A composition was prepared comprising:
400 grams of the resin prepared above,
3.2 grams of cobalt naphthenate containing 6 percent by weight cobalt, and
6.0 grams of a 60 percent solution of methyl ethyl ketone peroxide in dimethyl phthalate.

Castings prepared from this composition had the following physical properties:

| | |
|---|---|
| Tensile strength (psi) | 10,900 |
| Flexural strength (psi) | 20,000 |
| Elongation (%) | 2.42 |
| Charpy impact | 5.95 |
| HDT (°C) | 85 |
| G. E. candle | 29.7 |
| Barcol hardness | 42–44 |

What is claimed is:
1. A composition comprising
   a. a vinyl urethane resin comprising the reaction product of a mixture of a halogen-containing diol and a phosphonate having the formula:

$$\begin{array}{c} \text{RO} \\ \diagdown \\ \text{R'O} \end{array} \overset{\overset{\displaystyle O}{\parallel}}{\text{PR}_4\text{N}} \begin{array}{c} \diagup \text{R}_2\text{OH} \\ \diagdown \\ \text{R}_3\text{OH} \end{array}$$

wherein R and R' are selected from the group consisting of allyl, lower alkyl, and lower haloalkyl radicals; and $R_2$, $R_3$, and $R_4$ are lower alkylene or lower haloalkyl radicals, provided that either $R_2$ or $R_3$ must be an alkylene radical, wherein the amount of phosphonate in said mixture is such that the molar ratio of diol to phosphonate is equal to from about 0.4/0.6 to about 0.9/0.1; an isocyanate having a functionality equal to from about 2.0 to about 3.0; and a hydroxyl terminated ester of acrylic or methacrylic acid; provided that, (i) when the amount of the mixture of diol and phosphonate is equal to up to 1 mole the amount of the isocyanate is equal to about 2 moles per mole of the mixture and the amount of the hydroxyl terminated ester is equal to about 2 moles per mole of the mixture, and (ii) when the amount of the mixture of diol and phosphonate is equal to greater than 1 mole, the amount of isocyanate is equal to about 1 mole plus 1 mole per mole of the mixture and the amount of the hydroxyl terminated ester is equal to about 2 moles; and b. a monomer selected from the group consisting of styrene, t-butyl styrene, alpha methyl styrene, chlorostyrene, divinyl benzene, acrylic acid, dimethyl maleate, dibutyl fumarate, butyl methacrylate, nonyl methacrylate, and allyl alcohol.

2. A composition, as claimed in claim 1, wherein the halogen-containing diol has the formula:

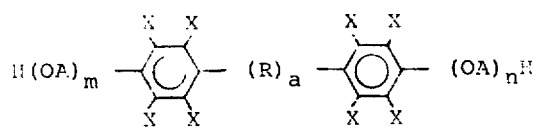

wherein each X is selected from the group consisting of hydrogen and halogen with the proviso that at least one X must be equal to halogen; R is selected from the group consisting of alkylidene and cycloalkylidene radicals containing from 1 to about 6 carbon atoms, oxygen, sulfur, and divalent radicals represented by one of the following formulae:

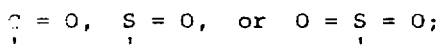

a is equal to either 0 or 1; A is an alkylene radical containing from 2 to 4 carbon atoms; and m and n are integers each of which is equal to at least 1 and the sum of which is equal to from at least 2 to about 6.

3. A composition, as claimed in claim 2, wherein the halogen-containing diol has the formula:

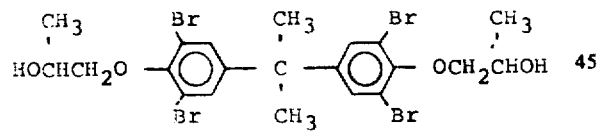

4. A composition, as claimed in claim 1, wherein the halogen-containing diol has the formula:

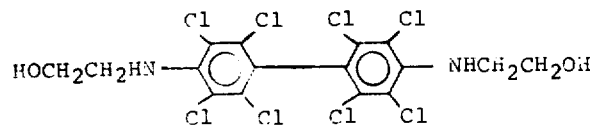

5. A composition, as claimed in claim 1, wherein the halogen-containing diol has the formula:

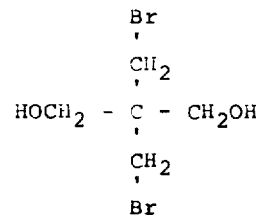

6. A composition, as claimed in claim 1, wherein the halogen-containing diol has the formula:

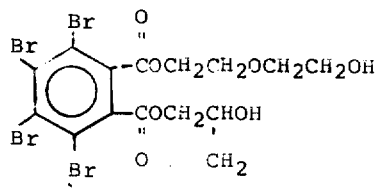

7. A composition, as claimed in claim 1, wherein the isocyanate has the general formula:

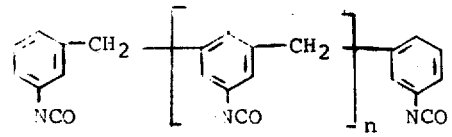

wherein $n$ is an integer equal to from about 0.1 to about 1.0.

8. A composition, as claimed in claim 1, wherein the isocyanate is toluene diisocyanate.

9. A composition as claimed in claim 1, wherein the isocyanate employed in the preparation of the vinyl urethane resin has a functionality greater than 2.0 and there is also employed in the preparation of the vinyl urethane resin a halogenated monoalcohol in an amount such that the number of moles of halogenated monoalcohol is equal to 2X where X is the functionality of the isocyanate minus 2.0.

10. A composition, as claimed in claim 9, wherein the halogenated monoalcohol is 2,3-dibromopropanol.

11. A composition, as claimed in claim 1, wherein the hydroxyl-terminated ester of acrylic or methacrylic acid is a hydroxyalkyl ester having the formula:

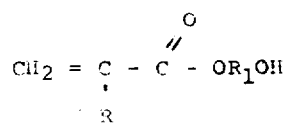

wherein $R_1$ is an alkyl group containing from 2 to about 4 carbon atoms and R is hydrogen or methyl.

12. A composition, as claimed in claim 11, wherein the hydroxyl-terminated ester of acrylic or methacrylic acid is hydroxyethyl methacrylate.

13. A composition, as claimed in claim 11, wherein $R_1$ has the following formula:

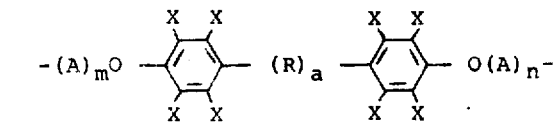

wherein each X is selected from the group consisting of hydrogen and halogen with the proviso that at least one X must be equal to halogen; R is selected from the group consisting of alkylidene and cycloalkylidene radicals containing from 1 to about 6 carbon atoms, oxygen, sulfur, and divalent radicals represented by one of the following formulae:

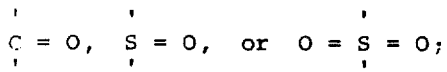

$a$ is equal to either 0 or 1; A is an alkylene radical containing from 2 to 4 carbon atoms; and $m$ and $n$ are integers each of which is equal to at least 1 and the sum of which is equal to from at least 2 to about 6.

14. A composition, as claimed in claim 1, wherein the phosphonate has the formula:

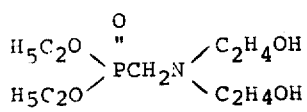

15. A composition, as claimed in claim 1, wherein the vinyl urethane resin comprises the reaction product of
  $x$ moles of the mixture of halogen-containing diol and phosphonate;
  $2x$ moles of the isocyanate; and
  $2x$ moles of the hydroxyl terminated ester of acrylic or methacrylic acid, wherein $x$ is equal to up to about 1.0.

16. A composition, as claimed in claim 1, wherein the vinyl urethane resin comprises the reaction product of
  $y$ moles of the mixture of halogen-containing diol and phosphonate;
  $y + 1$ mole of the hydroxyl terminated ester of acrylic or methacrylic acid, wherein $y$ is equal to at least 1.1.

17. A composition, as claimed in claim 1, wherein the monomer is styrene.

18. A method of preparing a vinyl urethane resin composition, said method comprising reacting an isocyanate having a functionality equal to from about 2.0 to about 3.0; with a mixture of a halogen-containing diol and a phosphonate having the formula:

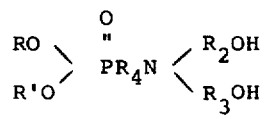

* * * * *

UNITED STATES PATENT AND TRADEMARK OFFICE
CERTIFICATE OF CORRECTION

PATENT NO. : 3,925,335
DATED : December 9, 1975
INVENTOR(S) : Erich Kuehn

Page 1 of 2

It is certified that error appears in the above—identified patent and that said Letters Patent are hereby corrected as shown below:

COLUMN 22, LINE 24, CONTINUE CLAIM 18 AS FOLLOWS:

-- wherein R and R' are selected from the group consisting of allyl, lower alkyl and lower haloalkyl radicals; and $R_2$, $R_3$, and $R_4$ are lower alkylene or lower haloalkyl radicals, provided that either $R_2$ or $R_3$ must be an alkylene radical, wherein the amount of phosphonate is such that the molar ratio of diol to phosphonate is equal to from about 0.4/0.6 to about 0.9/0.1 and a hydroxyl terminated ester of acrylic or methacrylic acid; provided that, (i) when the amount of the mixture of diol and phosphonate is equal to up to 1 mole the amount of the isocyanate is equal to about 2 moles per mole of the mixture and the amount of the hydroxyl terminated ester is equal to about 2 moles per mole of the mixture, and (ii) when the amount of the mixture of diol and phosphonate is equal to greater than 1 mole, the amount of isocyanate is equal to about 1 mole plus 1 mole per mole of the mixture and the amount of the hydroxyl terminated ester is equal to about 2 moles; said reaction being conducted in (b) a monomer selected from the group consisting of styrene, t-butyl styrene, alpha methyl styrene, chlorostyrene, divinyl benzene, acrylic acid, dimethyl maleate, dibutyl fumarate, butyl methacrylate, nonyl methacrylate,

UNITED STATES PATENT OFFICE
CERTIFICATE OF CORRECTION

Patent No. 3,925,335  Dated December 9, 1975

Inventor(s) Erich Kuehn

It is certified that error appears in the above-identified patent and that said Letters Patent are hereby corrected as shown below:

and allyl alcohol. --.

Signed and Sealed this twelfth Day of July 1977

[SEAL]

Attest:

RUTH C. MASON
Attesting Officer

C. MARSHALL DANN
Commissioner of Patents and Trademarks